US012189762B2

(12) United States Patent
Mendelson

(10) Patent No.: US 12,189,762 B2
(45) Date of Patent: Jan. 7, 2025

(54) SECURED SPECULATIVE EXECUTION PROCESSOR

(71) Applicant: Technion Research & Development Foundation Limited, Haifa (IL)

(72) Inventor: Abraham Mendelson, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 303 days.

(21) Appl. No.: 17/619,321

(22) PCT Filed: Jun. 19, 2020

(86) PCT No.: PCT/IL2020/050687
§ 371 (c)(1),
(2) Date: Dec. 15, 2021

(87) PCT Pub. No.: WO2020/255144
PCT Pub. Date: Dec. 24, 2020

(65) Prior Publication Data
US 2022/0300610 A1    Sep. 22, 2022

Related U.S. Application Data

(60) Provisional application No. 62/864,084, filed on Jun. 20, 2019.

(51) Int. Cl.
*G06F 21/55*    (2013.01)
*G06F 12/0875*    (2016.01)

(52) U.S. Cl.
CPC ........ *G06F 21/554* (2013.01); *G06F 12/0875* (2013.01); *G06F 2212/452* (2013.01); *G06F 2221/031* (2013.01)

(58) Field of Classification Search
CPC ...... G06F 21/554; G06F 21/75; G06F 21/755; G06F 12/0875; G06F 2212/452; G06F 2221/031; G06F 9/3842; G06F 9/3836
See application file for complete search history.

(56) References Cited

U.S. PATENT DOCUMENTS 6,055,650 A * 4/2000 Christie ................ G06F 9/3858
714/39
7,962,909 B1 * 6/2011 Klaiber ............... G06F 9/45533
718/1
(Continued)

FOREIGN PATENT DOCUMENTS

DE    112006001698 T5 *    4/2008    ........ G06F 9/30087
JP    H1196005 A *    4/1999
(Continued)

OTHER PUBLICATIONS

International Search Report and the Written Opinion Dated Sep. 21, 2020 From the International Searching Authority Re. Application No. PCT/IL2020/050687. (12 Pages).
(Continued)

*Primary Examiner* — Bassam A Noaman

(57) ABSTRACT

A system, a method and a computer program product for protecting a speculative execution processor from side channel attacks, are disclosed. The system comprises a processing circuitry which performs an execution of a code segment, in one time period and copies, in another time period, only a committed portion of the executed code segment into a memory component which is accessible to read actions by an external processing unit. The speculative instructions are stored in an internal cache memory which is not accessible to read actions by the external processing unit.

17 Claims, 12 Drawing Sheets

(56) References Cited

U.S. PATENT DOCUMENTS

| | | | |
|---|---|---|---|
| 9,378,363 B1* | 6/2016 | Patel | G06F 9/45533 |
| 2008/0046692 A1* | 2/2008 | Michalak | G06F 9/3842 |
| | | | 712/E9.05 |
| 2008/0288819 A1* | 11/2008 | Heller, Jr. | G06F 11/141 |
| | | | 711/149 |
| 2018/0285112 A1* | 10/2018 | Mekkat | G06F 9/3842 |
| 2018/0323960 A1* | 11/2018 | Courtney | H04L 9/005 |
| 2019/0004961 A1 | 1/2019 | Boggs et al. | |
| 2019/0050230 A1 | 2/2019 | Branco et al. | |
| 2019/0114422 A1* | 4/2019 | Johnson | G06F 9/30105 |

FOREIGN PATENT DOCUMENTS

| | | | | |
|---|---|---|---|---|
| WO | WO-2019005975 A1 * | 1/2019 | | G06F 12/0802 |
| WO | WO 2020/255144 | 12/2020 | | |

OTHER PUBLICATIONS

Khasawneh et al. "SafeSpec: Banishing the Spectre of A Meltdown With Leakage-Free Speculation", 2019 56th ACM/IEEE Design Automation Conference, DAC '19, Las Vegas, NV, USA, Jun. 2-6, 2019, 14 P., Jun. 2, 2019.

Kocher et al. "Spectre Attacks: Exploiting Speculative Execution", 2019 IEEE Symposium on Security and Privacy, SP 2019, ArXiv Preprint ArXiv:1801.01203v1, p. 1-16, Jan. 3, 2018.

* cited by examiner

| V | R | Entry_Address | Exit_Address | Time |
|---|---|---|---|---|

Figure 5a

| V | R | Entry_Address | Exit_Address | Time |
|---|---|---|---|---|
| V | R | Entry_Address | Exit_Address | Time |
| ... | ... | ... | ... | ... |
| V | R | Entry_Address | Exit_Address | Time |

Figure 6

Table : Basic simulation parameters

| Feature | Simulation Parameters |
|---|---|
| Level 1 data cache | 32K, 4-way, LRU, 1-cycle latency |
| Level 1 instruction cache | 32K, 4-way, LRU, 1-cycle latency |
| Level 2 combined data & Instruction cache | 512K, 4-way, LRU, 8-cycle latency |
| Branch predictor | Bi-modal, 2-level |
| Instruction TLB | 64K, 4-way, LRU |
| Data TLB | 128K, 4-way, LRU |
| Memory access latency | 200 CPU cycles |

Figure 8

Table : Machine configuration

| Topic | Parameter | Machine Width | | |
|---|---|---|---|---|
| | | Narrow | Medium | Wide |
| Pipeline width | Fetch | 2 | 4 | 8 |
| | Decode | 2 | 4 | 8 |
| | Issue | 2 | 4 | 8 |
| | Commit | 2 | 4 | 8 |
| Array sizes | ROB | 64 | 128 | 256 |
| | (LSQ) | 32 | 32 | 32 |
| Number of ALUs | Int- adder | 2 | 4 | 8 |
| | Int- Mult | 1 | 1 | 1 |
| | FP adder | 1 | 1 | 2 |
| | FP Multiplier | 1 | 1 | 1 |
| | AGU | 1 | 1 | 1 |

Figure 9

# SECURED SPECULATIVE EXECUTION PROCESSOR

RELATED APPLICATIONS

This application is a National Phase of PCT Patent Application No. PCT/IL2020/050687 having International filing date of Jun. 19, 2020, which claims the benefit of priority under 35 USC § 119(e) of U.S. Provisional Patent Application No. 62/864,084 filed on Jun. 20, 2019. The contents of the above applications are all incorporated by reference as if fully set forth herein in their entirety.

TECHNICAL FIELD

The present disclosure, in some embodiments thereof, relates to computing systems and, more specifically, but not exclusively, to a system for protecting speculative execution processors from side channel attacks.

BACKGROUND

Speculative execution is a technique used by modern processors with out of order architecture to speed up performances, where the processor may execute some tasks ahead of time before it is known whether these tasks are actually needed. When the tasks are really required, the speed up is achieved since the work is already completed, and the delay that would have been incurred by doing the task after it is known that it is needed, is prevented. However, in cases the tasks are not needed after all, most changes made by the work that was done is reverted and the results are ignored.

SUMMARY

It is an object of the present disclosure to describe a system and a method for protecting a speculative execution processor from side channel attacks without compromising performances.

The foregoing and other objects are achieved by the features of the independent claims. Further implementation forms are apparent from the dependent claims, the description and the figures.

In one aspect, the present disclosure relates to a system for protecting a speculative execution processor, from side channel attacks, comprising a processing circuitry, adapted to:

in a first time period performing an execution of a code segment by storing speculative instructions in an internal cache memory which is inaccessible to read actions of an external processing unit;

in a second time period copying only a committed portion of the executed code segment into another memory component which is accessible to read actions of the external processing unit;

wherein the first and second time periods are different and independent.

In a further implementation of the first aspect, the processing circuitry is further adapted to:

measure an execution time of the code segment in a plurality of time intervals;

update a time register to include a highest execution time measured for the plurality of time intervals; and delay the copying only the committed portion of the executed code segment into the another memory component according to the highest execution time.

In a further implementation of the first aspect, the processing circuitry is further adapted to:

delay the copying only the committed portion of the executed code segment into the another memory component according to a value which is not correlated with the actual execution time measured.

In a further implementation of the first aspect, a user annotates the beginning and the end of the code segment with dedicated instructions respectively.

In a further implementation of the first aspect, the executed code segment annotated by the user is a single entry code segment.

In a further implementation of the first aspect, the executed code segment annotated by the user is a multi-entry code segment.

In a further implementation of the first aspect, the annotation of the multi-entry code segment is extended, according to a number of an entry.

In a further implementation of the first aspect, in the multi entry code segment each entry is allocated in a table-like structure and each entry number is determined by using one or more hash functions that take an address of the instruction annotating the beginning of the protected code segment as a parameter.

In a further implementation of the first aspect, the processing circuit is further adapted to add noise in conjunction with the execution of the code segment to increase a noise to signal ration.

In a further implementation of the first aspect, the processing circuitry is adapted to perform a double execution of the code segment.

In a further implementation of the first aspect, the speculative instructions stored in the internal cache memory are load and store instructions.

In a further implementation of the first aspect, the internal cache memory is virtually tagged.

In a further implementation of the first aspect, the internal cache memory is exclusive so that data cannot be stored in the internal cache memory and into the another memory component at a same time.

In a further implementation of the first aspect, the internal cache memory is cleaned at the end of a process.

In a further implementation of the first aspect, the internal cache memory is dynamically partitioned among different threads.

In a further implementation of the first aspect, the internal cache memory is a scratchpad memory.

In a second aspect, the present disclosure relates to a method for protecting speculative execution processor, from side channel attacks, comprising:

in a first time period performing an execution a code segment by storing speculative instructions in an internal cache memory which is inaccessible to read actions of an external processing unit;

in a second time period copying only a committed portion of the executed code segment into another memory component which is accessible to read actions of the external processing unit;

wherein the first and second time periods are different and independent.

In a further implementation of the second aspect, the method further comprising:

measuring an execution time of the code segment in a plurality of time intervals;

updating a time register to include a highest execution time measured for the plurality of time intervals; and delaying the copying only the committed portion of the executed code segment into the another memory component according to the highest execution time.

In a third aspect, the present disclosure relates to a computer program product provided on a non-transitory computer readable storage medium storing instructions for performing a method for protecting speculative execution processor, from side channel attacks, comprising:

in a first time period performing an execution a code segment by storing speculative instructions in an internal cache memory which is inaccessible to read actions of an external processing unit;

in a second time period copying only a committed portion of the executed code segment into another memory component which is accessible to read actions of the external processing unit;

wherein the first and second time periods are different and independent.

In a further implementation of the third aspect, the method performed by the computer program product further comprising:

measuring an execution time of the code segment in a plurality of time intervals;

updating a time register to include a highest execution time measured for the plurality of time intervals; and delaying the copying only the committed portion of the executed code segment into the another memory component according to the highest execution time.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5a schematically shows a data structure of the time prediction unit for a single entry support, according to some embodiments of the present disclosure;

FIG. 6 schematically shows a data structure of the time prediction unit for a multi entry support, according to some embodiments of the present disclosure;

FIG. 8 is a table of a basic simulation parameters of simulations performed, according to some embodiments of the present disclosure;

FIG. 9 is a table, which provides the machine configurations used for the simulations, according to some embodiments of the present disclosure;

DETAILED DESCRIPTION

Figure 1:
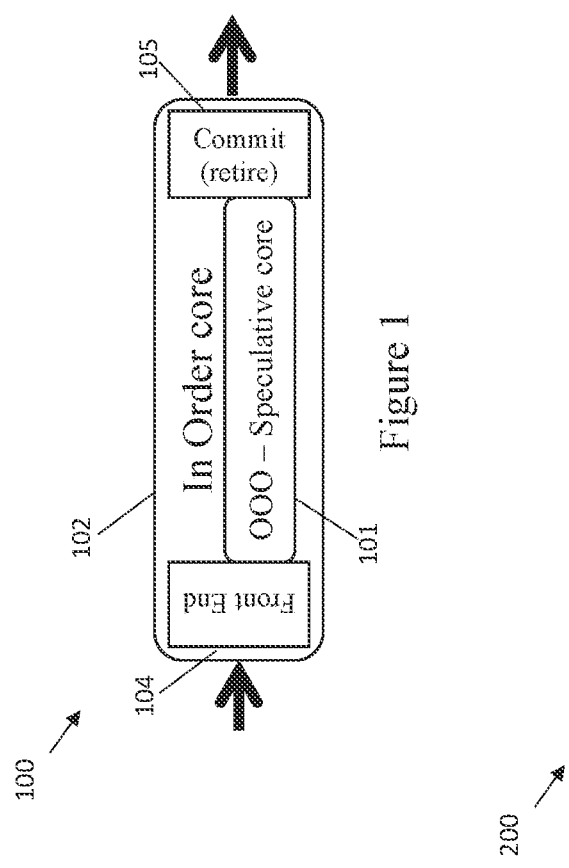
FIG. 1 schematically shows a high level view of an out-of-order system with an out of order processor.

The present disclosure, in some embodiments thereof, relates to computing systems and, more specifically, but not exclusively, to a system for protecting speculative execution processors from side channel attacks. The system comprises a processing circuitry, adapted to: in a first time period performing an execution of a code segment by storing speculative instructions in an internal cache memory which is inaccessible to read actions of an external processing unit;

in a second time period copying only a committed portion of the executed code segment into another memory component such as a cache memory or one or more registers and the like, which is accessible to read actions of the external processing unit. The first and second time periods are different and independent, so that the second time period is independent of data executed in the first time period.

Side channel attacks in computing security are attacks based on information gained from the implementation of the computer system, rather than weaknesses in the implemented algorithm itself as in software bugs for example. The sources of information in side channel attacks may be for example: timing information, power consumption, electromagnetic leaks, sound and the like. Each of these sources of information can provide an extra source of information, which can be exploited by side channel attackers.

Speculative execution processors have been found to be vulnerable to side channel attacks, and suffered a large amount of side channel attacks.

However, speculation is needed to cope with the growing demand for computing power and to overcome the fundamental limitations of current technology, such as memory-walls or lack of scalability in frequency.

Existing solutions deal with the side channel attacks by enhancing the structure of out of order processors, which supports speculative execution, but this solution causes a major performance degradation.

The system of the present disclosure provides, according to some embodiments of the disclosure, a secured speculation execution processor with an architecture, which achieves security by adding a unique wrapper that includes different anti-tampering techniques, yet preserve performance.

In the secure speculative execution processor of the system of the present disclosure two main principles exist, and enable the implementation of the system. The first principle is that a state can speculatively be changed provided that when miss-speculation occurs, no traces of the speculation remain on the system; the recovered state is identical to the state without speculation and the observable timing does not depend on speculation. The second principle is that, when an out-of-order processor is wide enough, its performance primarily depends on the time that dependencies are resolved and not on the time operations are committed.

Using these two principles, the system of the present disclosure provides a new speculative execution processor that is also secured. According to some embodiments of the present disclosure, in the system of the present disclosure, speculative data never impacts the committed state, and retired instructions (e.g., timing, power, electromagnetic fields) are not dependent on the values or the state of the system.

According to some embodiments of the present disclosure, the system separates the execution stage from the commit stage, first by supporting speculative load and store instructions by an internal cache memory. The internal cache memory is inaccessible to any external inaccessible to read actions of an external processing unit or any other entity (including attackers) and once execution is done, only a committed code segment is copied into an external cache memory, which is accessible to read actions of an external processing units (or any external entity). This way, speculative operations i.e. speculative load and store operations are supported by the internal cache and are not exposed to external entities. Another separation is done between an actual execution time of the code segment and a commit time of the code segment.

From the micro-architecture point of view, the system implements a "restricted data flow" that is based on a Reduced Instruction Set Computing (RISC) architecture, known as micro-operations (uOp). These uOps are executed in an order, which is based on the input parameters and resources that are available. This structure is also known as out-of-order (OOO) execution. The translation between in-order, where the operation are executed according to order in the program, and out-of-order ISAs is handled by a hardware-based compiler and supported by the uOp cache, a micro-coder, and several other dedicated modules.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which schematically shows a high level view of an out-of-order system 100, with an out of order processor.

At a high level, an out of order execution system may be referred to as an out-of-order processor 101 wrapped in an in-order processor 102. This structure simplifies the execution model so it can support exact exception and achieve high frequency, even when supporting a complex instruction set architecture (CISC). Using this structure also allows the use of extensive speculation, which helps overcome many potential bottlenecks.

In general, an out of order processor is an integrated circuit having a processing unit coupled via a bus to an interface. The processing units may have a memory cache associated therewith, and the integrated circuit may also have a further memory cache(s) provided thereon which may be shared by other functional units. As will be appreciated by a person skilled in the art, other functional units may also be provided on the integrated circuit, for use by the processing unit.

Microarchitecture of modern out of order processor has three main parts: frontend unit 104, out of order execution processor 101, and a commit (retirement) unit 105. The frontend unit 104 and the commit unit 105 are traditionally executed in-order. The frontend unit 104 is a processing circuitry, which fetches instructions from memory and translates them into micro-operations (uOps). These uOps are fed to the out-of-order processor, which schedules and executes instructions according to their data dependencies and not according to the program order. The commit (retirement) unit 105 a processing circuitry, which exposes the instructions to external entities in the same order in which they were fetched and dismisses all speculative instructions that were found to be on miss-speculation paths. The commit unit stores the non-speculative instructions into a storage component such as registers, memory and the like, which may be accessed by any external entity (a visible state component).

Figure 2:
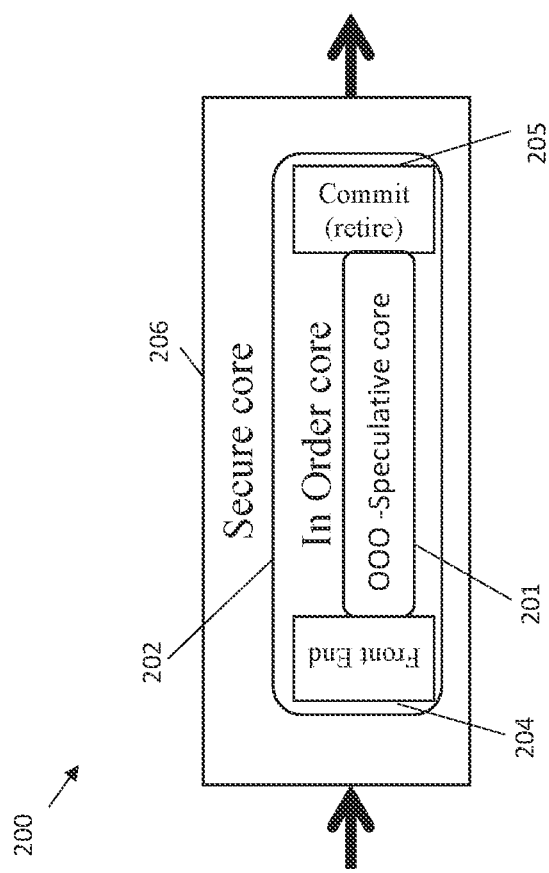
FIG. 2 schematically shows a high level structure of a system with a secured speculative execution processor, according to some embodiments of the present disclosure.

FIG. 2, schematically shows a system 200, with a secured speculative execution processor, according to some embodiments of the present disclosure. System 200 consists of: an out of order processor 201, an in order processor 202, a frontend unit 204, a commit unit 205 and a secure wrapper 206. System 200, according to some embodiments of the present disclosure, addresses security considerations as part of the basic structure of the architecture. This is done in a way that is based on the relations between the in-order processor and the out-of-order processor in modern architectures. In system 200, according to some embodiments of the present disclosure, the secure wrapper 206 is added to the basic structure of the architecture, which contains an out of order processor 201, an in order processor 202, a frontend unit 203 and a commit unit 204. The secured wrapper 206 is accessible to read actions of external processing units (or any other external entity), while the speculative execution processor is inaccessible to read actions of external processing units (or any other external entity).

According to some embodiments of the present disclosure, the system of the present disclosure provides to external entities (for example a side channel attacker) with a view that is different from the actual execution characterizations of the speculative execution processor and with minimal impact on performance of the speculative execution processor. Due to the fact that a side channel attacker of the system, can only observe the secure wrapper 206, the system imposes restrictions to make sure the separation between the secured wrapper, and the speculative execution processor, is maintained, even when the underlying architecture of the speculative execution processor may not support what is presented in the secure wrapper 206. For example, the internal structure of the speculative execution processor can use speculation, and the internal speculative execution processor can execute a code in a non-secure manner, as long as an external entity gets a view of a secured processor, which is not speculative.

According to some embodiments of the present disclosure, the secure wrapper of the system implements and manages all tamper-resistant and countermeasure mechanisms against side channel attacks. For example: preventing timing attacks, guaranteeing that no speculative state is exposed to the outside world (e.g., attacker), guaranteeing the trusted execution environment (TEE) conditions, preventing any kind of unauthorized access or modification to data, and so forth.

Figure 3:
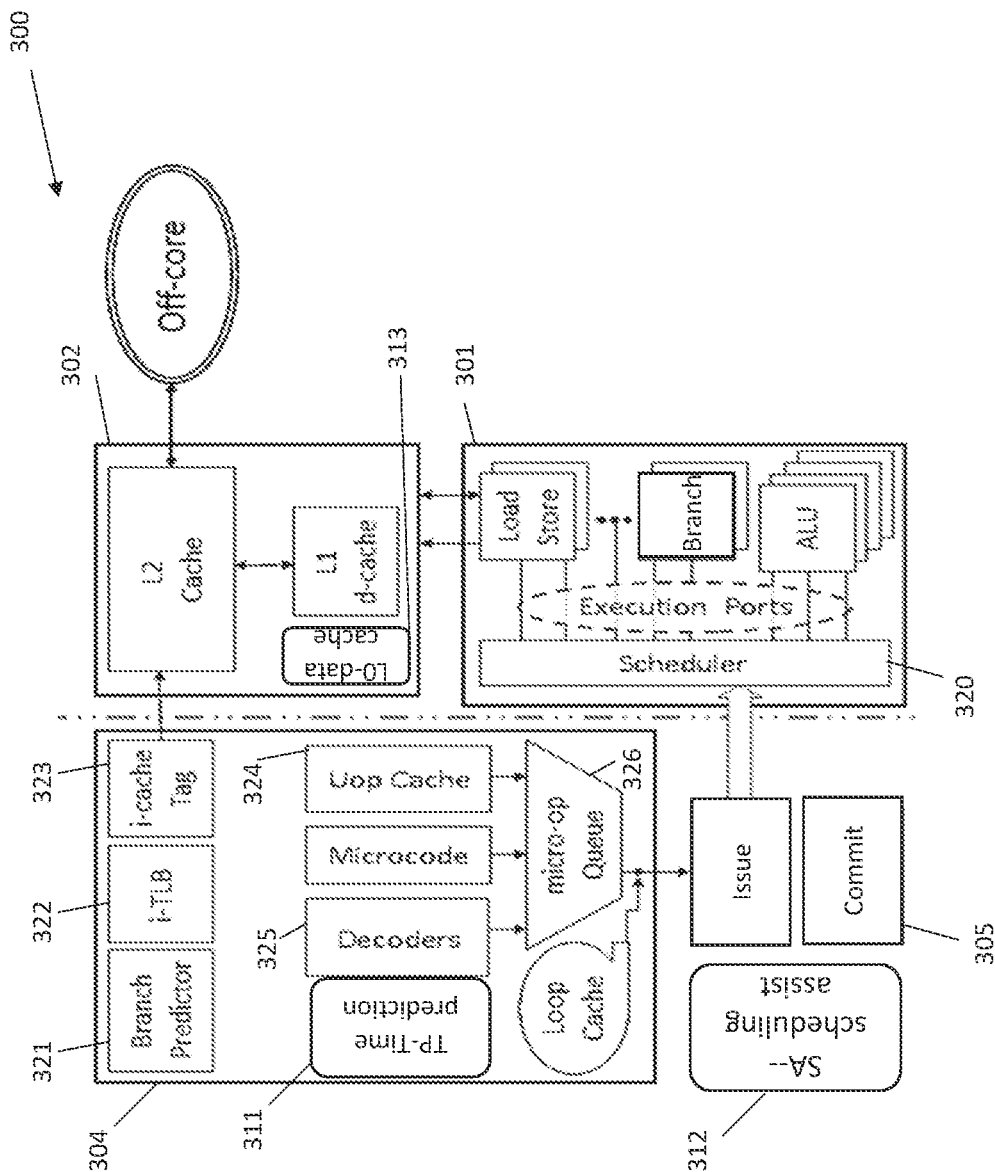
FIG. 3 schematically shows one possible implementation of an architecture of a system with a secured speculative execution processor, according to some embodiments of the present disclosure.

FIG. 3 schematically shows one possible implementation of an architecture of a system 300 with a secured speculative execution processor, according to some embodiments of the present disclosure. The system protects a speculative execution processor from side channel attacks by separating between the actual execution stage, in which the speculative operations are executed, and the commit stage, where the operations are presented to external entities. System 300, includes an out of order processor 301, a memory subsystem 302, a frontend unit 304 and a commit unit 305. The frontend unit 304 is a processing circuitry, which fetches the instructions from memory, decode the instructions and translate them into micro-operations (uOps). The frontend unit includes a branch predictor 321, which predicts the next fetch address, an instruction translation lookaside buffer (i-TLB) 322, an instruction cache tag 323, a uOps cache 324, a decoder 325, and a uOps queue 326. The uOps are fed to the out of order execution processor, which executed the uOps according to data dependencies and not according to the program order. Scheduler 320 schedules the execution of the uOps. In addition, according to some embodiments of the present disclosure, system 300 includes a time prediction unit 311, a scheduler assistant unit 312 and an internal cache memory 313. The time prediction (TP) unit, according to some embodiments of the present disclosure, is a processing circuitry, which prevents from time related information to leak to external entities. This is done by separating between an actual execution time of a code segment and a commit time of the code segment. The separation is achieved by predicting after every execution of the same code segment a commit time which is presented to external entities and which is the same for all executions of the same code segment independently of any internal data. The internal data, which is secret, is kept secured this way and is not exposed to the external entities.

The scheduler assistant (SA) unit 312, according to some embodiments of the present disclosure, is a processing circuitry, which extends the functionality of the instruction scheduler and the commit (retirement) unit by delaying committed instructions. The scheduler assistant unit may be implemented for example with a time delaying component.

In addition, according to some embodiments of the present disclosure, the scheduler assistant unit may add noise that is randomly generated to increase the noise to signal ratio and to perform a double execution of the code segment to prevent fault injection. When the double execution is implemented, several additional data structure should be updated.

In system 300 the internal cache memory 313, supports speculative load and/or store instructions inside the secured speculative execution processor of the system, so that no trace of speculative uOps that are necessary eventually are exposed to the external entities, including side channel attackers.

According to some embodiments of the present disclosure, the internal cache memory handles all data accesses before being committed. The internal cache memory is inaccessible to read action of an external processing unit (or any external entity) and copy only a committed code segment into an external cache memory, which is accessible to rad actions of an external processing unit (or any external entity).

Figure 4:
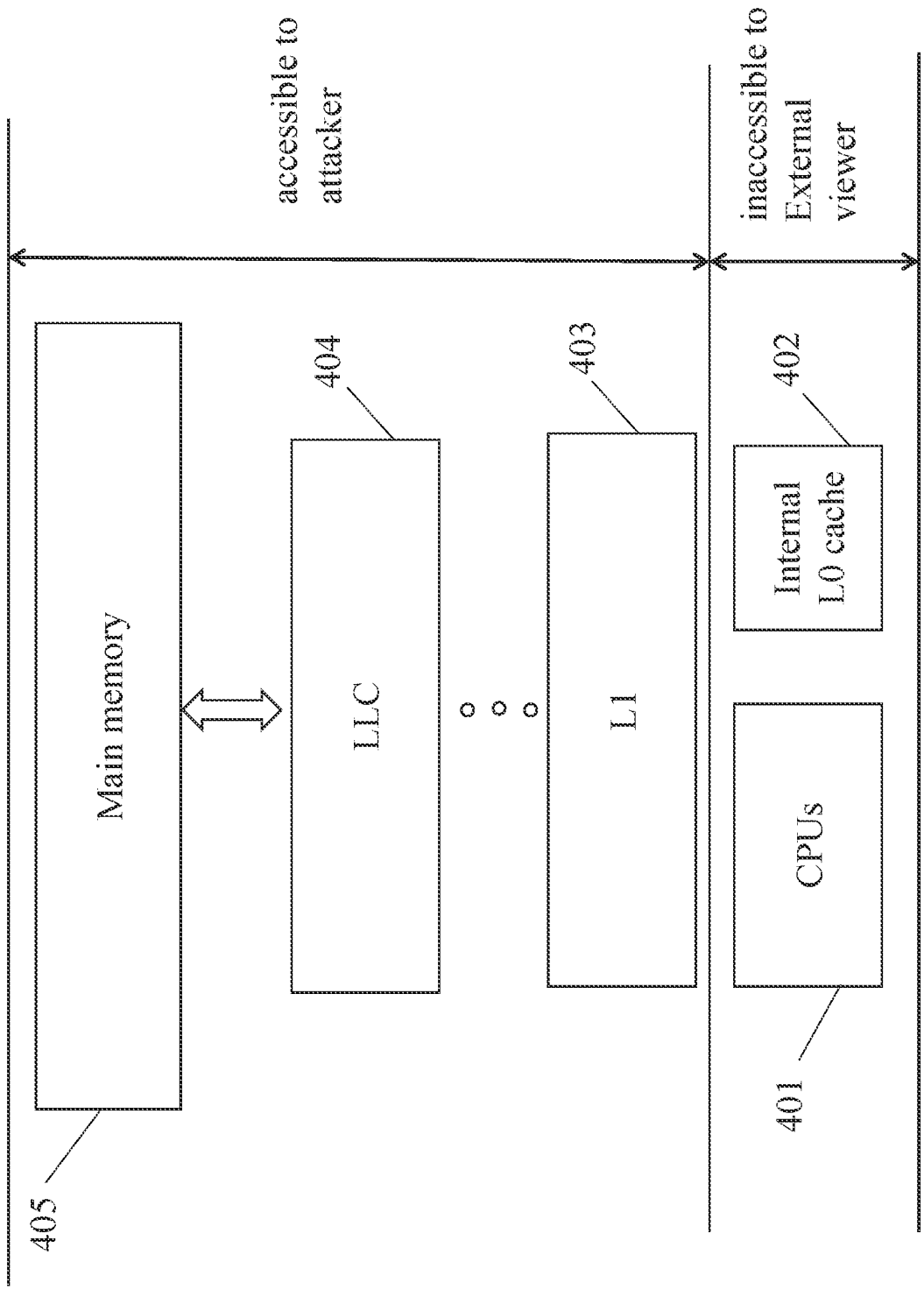
FIG. 4 schematically shows the protection against speculative loads and/or store operations, according to some embodiments of the present disclosure.

FIG. 4 schematically shows the protection against speculative loads and/or store operations, according to some embodiments of the present disclosure. The internal cache memory 402 and one or more central processing units (CPUs) 401, are inaccessible to read action of an external processing unit (or any external entity). The external level of cache memory, starting with the first level cache 403 to the last level cache (LLC) 404 and the main memory 405 are accessible to read action of an external processing unit (or any external entity), including attackers.

According to some embodiments of the present disclosure, the internal cache memory is virtually tagged and is exclusive so that data cannot be stored in the internal cache memory and into another cache memory at a same time. Pre-fetched data is inserted to the internal cache memory and when a load or store operation is committed, the data is moved from the internal cache memory to another external cache memory, which is exposed to external entities. According to some embodiments of the present disclosure, when a process in the secured speculative execution processor switches, the content of the internal cache memory is cleaned. No write-back operation from the internal cache memory to another cache memory is needed when the internal cache memory is cleaned since it keeps only speculative, uncommitted data. According to some embodiments of the present disclosure, when address space identifier (ASID) bits are used, the internal cache memory structure may be extended to simultaneously serve as a private cache for each active process (with respect to the ASID number).

The use of the internal cache memory reduces the vulnerability that may be caused by speculative accesses to memory (e.g., in the case of Spectre or Meltdown attacks).

According to some embodiments of the present disclosure, the use of the internal cache memory can be extended by allowing the internal cache memory to be dynamically partitioned among different threads. According to some embodiments of the present disclosure, the internal cache memory may be implemented by a scratchpad memory, which is a memory that is managed by a user as a client device, rather than being managed by hardware.

According to some embodiments of the present disclosure, the internal cache memory may be implemented as a local memory, register or any other memory element.

According to some embodiments of the present disclosure, the system may include physical unclonable function (PUF) based elements.

The addition of the internal cache memory allows to isolate the memory accesses between processes, so the speculative access (data and control) of one process cannot impact the performance or state of another process and/or thread. From a security perspective, the use of the internal cache memory (i.e. a private cache) for all speculative memory access prevents Spectre and Meltdown types of attacks.

Implementing the internal cache memory may require an area similar to the general cache, however adding silicon is negligible in modern computers architecture.

Experiments conducted by the inventors of the present disclosure shows that the addition of the internal cache memory do not limit the amount of memory speculation in the system.

According to some embodiment of the present disclosure, the system addresses different side-channel attacks, such as timing attacks, power-related attacks, speculation access to memory (e.g., Spectre and Meltdown) and the like. The system also may be useful for addressing other types of attacks such as fault injection.

Side-channel timing attacks can occur when the time it takes to complete the execution of a single instruction or the execution of an execution path, depends on the value of a secret data or on the values of some of the secret data bits. Countermeasures against timing attacks are divided between software-based and hardware-based techniques.

Software techniques pad the code with dummy instructions so that all execution paths are balanced. The hardware-based techniques add extra logic to balance the different execution paths, so they are not dependent on the values computed. This task can be costly. The software techniques require intensive work from a programmer and must be re-balanced from one architecture to another. The hardware implementations can be costly in term of performance and power, especially when they are implemented for general-purpose execution units or require the use of separate execution units for security purposes (e.g., advanced encryption standard (AES) instruction set extension).

The system of the present disclosure, in some embodiments thereof, enhances the microarchitecture so it can distinguish between the time it takes to execute the instruction or the execution path, and the time it takes to commit the instruction to a user-viewable space. According to some embodiments of the present disclosure the impact of delaying the commit time is minimal, when the internal dependencies are resolved and allow the forward progress of other operations in the system.

There are different ways to implement a system, which distinguishes between the execution time and the commit time. According to some embodiments of the present disclosure, one possible solution, which aims to automatically balance the execution of code segments that were annotated by a user, is to annotate these code segments with a pair of instructions denoted as begin_secure and end_secure.

Figure 5A:
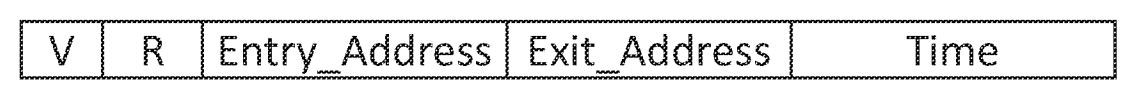

FIG. 5a schematically shows a data structure of the time prediction unit for a single entry code segment support, according to some embodiments of the present disclosure. A single entry code segment is a code segment that accesses a single section at a memory so that only one section at the memory needs to be protected at one time. The data structure of the time prediction unit comprises a table-like structure of one line with a valid bit register, a random bit register, an entry address register, an exit address register and a time register. The time register stores the longest time it took to execute the same code segment.

The time prediction unit also includes a counter that tracks execution to support timing-related operations (not shown).

Figure 5B:
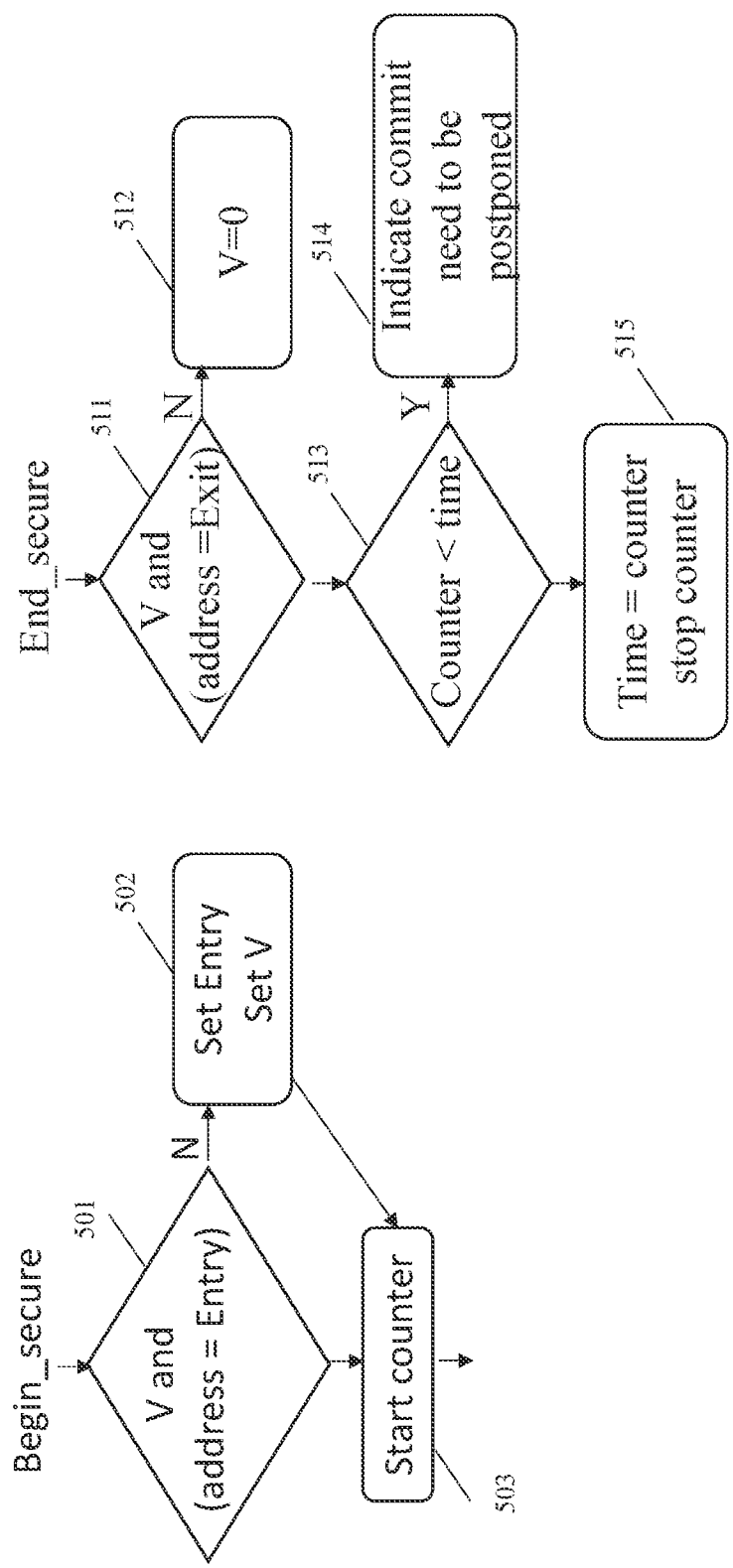
FIG. 5b schematically shows a flowchart of a method for annotating a code segment in a single entry, according to some embodiment of the present disclosure.

FIG. 5b schematically shows a flowchart of a method for annotating a code segment in a single entry, according to some embodiment of the present disclosure.

At 501, when a begin_secure instruction is decoded, the valid bit register is checked. When the valid bit register is not set (i.e. V=0) and its address is not equal to the entry address register, than at 502 the valid bit register is set to 1 and the entry address register is set to 1 and then, at 503 the hardware counter is started. Otherwise, when the valid bit register is set (i.e. V=1) and its address is equal to the Entry address register in the time prediction unit, it indicates that the timing of the code segment being executed needs to be protected, so at 503 the hardware counter is started.

At 511, when a program running the code segment reaches the end_secure, it is checked whether the valid bit register is set and the address of the instruction equals to the entry address register. At 512, if the address of the instruction does not match the address, which is stored in the entry address register, the entry address register is modified to contain the address of the instruction, and the counter (if active) is stopped, and a value of 1 is inserted to the valid bit register. If the address matches the entry address register and the counter is active, the following is performed: If the valid bit register is set and the counter is active, at 513, the value stored at the counter is compared to the value stored at the time register in the time prediction unit. When the value of the counter is lower than the value stored at the time register, it means that the execution of that code segment was faster this time than the previous time the same code segment was executed. In this case, at 514, the time prediction unit indicates to the scheduler assistant unit that the commit time of this code segment should be postponed to meet the previous time the code segment was executed. In response, the scheduler assistant delays the commit time of the code segment to be the same as the time stored at the time register.

When the value of the counter is higher than the value stored at the time register, it means that the execution of that code segment was slower this time than the previous time the same code segment was executed. In this case, at 515, the system updates the time register to impact the next time this code segment will be executed and the counter is stopped.

According to some embodiment of the present disclosure, the time prediction unit, may also include a random bit register. When the random bit register is set and the execution time is found to be shorter than the time kept by the time register of the time prediction unit, the scheduler assistant may choose not to wait the entire time, which is stored at the time register, which is the time that matches the worst case (i.e. the longest time). Instead, the scheduler assistant unit may choose a random delay time (typically shorter than the value stored at the time register), which cannot be correlated with the actual execution time measured.

Thus, it can reduce the wait time for commit (retirement) time and thereby potentially improve timing and power. The random bit is user-defined and can be used only if the user trusts the true random generator provided by the system (from the security standpoint).

FIG. 6, schematically shows a data structure of the time prediction unit for a multi entry code segment support, according to some embodiments of the present disclosure. A multi-entry code segment is a code segment that access multiple sections at the memory, so that multiple sections at the memory needs to be protected at one time. Support for multiple entries is needed primarily for multiple nested secure regions or to support multi-threaded applications. Here, the data structure of the time prediction unit needs to be extended to a table-like structure with multiple lines where each line comprises a valid bit register, a random bit register, an entry address register an exit address register and a time register.

When supporting multiple entries, new issues are raised, such as how to match between the begin_secure and the end_secure, how to select the entry to be used, and the like.

According to some embodiments of the present disclosure, one possible solution to the problem is to have a user-defined or compiler-defined assistant solution. In this case, the annotations of the code (e.g., begin_secure and end_secure instructions) need to be extend with the entry number. Using this solution simplifies the hardware, but may not allow using the mechanism as part of system libraries, multi-threading, and similar situations.

According to some other embodiments of the present disclosure, another solution is to allocate the entry in a table-like structure and determine the entry number by using some hash function that takes the address of the begin_secure instruction as a parameter. Each entry in this table points to another entry (in another table) that indicates the address of the "paired" end_secure in the structure. As before, each entry also keeps a valid bit register and a few more registers which represent fields that help manipulate the security needs and track the security-related execution needs.

A method for annotating the code segment in a multi-entry support, according to some embodiment of the present disclosure is described herein. When the instruction begin_secure is decoded, the entry in the main table is calculated as a function of the current instruction pointer (IP). If the valid bit register is 0 or the address is not equal to a begin entry address register, (i.e. (V==0) or (address !=begin_entry)), than the valid bit register is set to 1 and the begin entry address register is set to IP address (V=1 and "begin_address"=IP).

If the valid bit is set to 1 and the address is set to the begin entry address register ((V=1) && (Address=begin_address)) than a temporary clock is started.

Then, when an end_secure instruction is decoded, the system makes an associative search on all addresses that are recoded as valid exit points of a secure region if found. When the counter is active, it is checked if the commit time (retirement) needs to be postponed or update the entry address register and the counter is stopped. When an end_secure instruction is decoded and the exit point is not found, the exit_address register is updated with the latest entry that has a valid entry_address but not a not-valid exit_address.

According to some embodiments of the present disclosure, the random bit register may be used, to choose a random commit time, which cannot be associated with the actual execution time, as explained above.

The time balancing solution is speculative, so it is needed to make sure that the commit time is not postponed for more than a maximum delay time denoted as max_delay.

When the random option is supported, in some cases, it can significantly reduce the performance overhead. But, postponing the commit time, generally has a minor impact on overall performance of the secured speculative execution processor, according to some embodiments of the disclosure.

Many side-channel attacks are based on a physical phenomenon, such as power consumption and electromagnetic fields, assuming they can be measured and/or estimated by the attacker and assuming their intensity depends on the value of the secret data. Methods such as Simple Power Analysis (SPA), Differential Power Analysis (DPA), and Electromagnetic based attack (EM) demonstrate their effectiveness in exposing security keys.

Common countermeasures against such attacks balance all execution paths and implement selected functionalities in a redundant manner such that each execution path has different characteristics. This way, an execution path can be chosen in a random way or noise can be added, making it difficult to distinguish between noise and actual signals. The main difficulty in this approach is that while protecting the system against one type of attack, it may leave the system open to other types of attacks, which are not considered by the protecting method.

According to some embodiments of the present disclosure, the architecture of the system of the present disclosure, optionally enables adding an extra logic that generates different types of noise. This extra logic can consume a small area with almost no impact on power consumption. Once this logic is added, it may enhance the instruction scheduler to activate these modules in a random manner, in conjunction with the actual execution. By separating the noise conductor units from the actual execution, the following is achieved:
1. the implementation of the execution units and the execution paths remain the same;
2. the noise generator units are shared among different execution paths;
3. multiple noise generators can be operated in parallel; and
4. the time the noise generators are active can be limited to sections with secure code, in order to reduce overhead.

From the security point of view, each time data is accessed before being committed, it should be treated as "speculative access." To build a high-performance architecture, data should be allowed to be accessed speculatively. However, to avoid leaking secrets, one must make sure the committed state (externally viewed state) is not affected by any non-committed operation, such as prefetching data that is accessed through speculative execution.

Fault injection is a common method used by attackers to expose secrets by differentiating between the case where a value of a bit is one and the case that the value of the bit is zero. By externally flipping the value of a bit, attackers can guess the value of the original bit.

Due to the use of small physical features in modern process technologies, transient faults (i.e., flipping a value of a bit due to physical conditions) are becoming common. All major architectures include mechanisms that aim to prevent such faults from becoming an error. Implementing such a mechanism can be expensive in its area consumption (if three modules redundancy (TMR) is being used) or can be insecure if the execution of faulty data becomes longer than the execution of non-faulty data. Another alternative is the use of double execution, which has proven to be an efficient way to handle the faults with minimal impact on performance and area.

According to some embodiments of the present disclosure, when sensors are added to the systems, some of these elements may be operated selectively; e.g., the laser fault injection indicator can activate the double execution mode.

According to some embodiments of the present disclosure, the structure of the system, allows programmable secure mechanisms that can be modified dynamically. This contains the potential to address future attacks when discovered.

Figure 7:
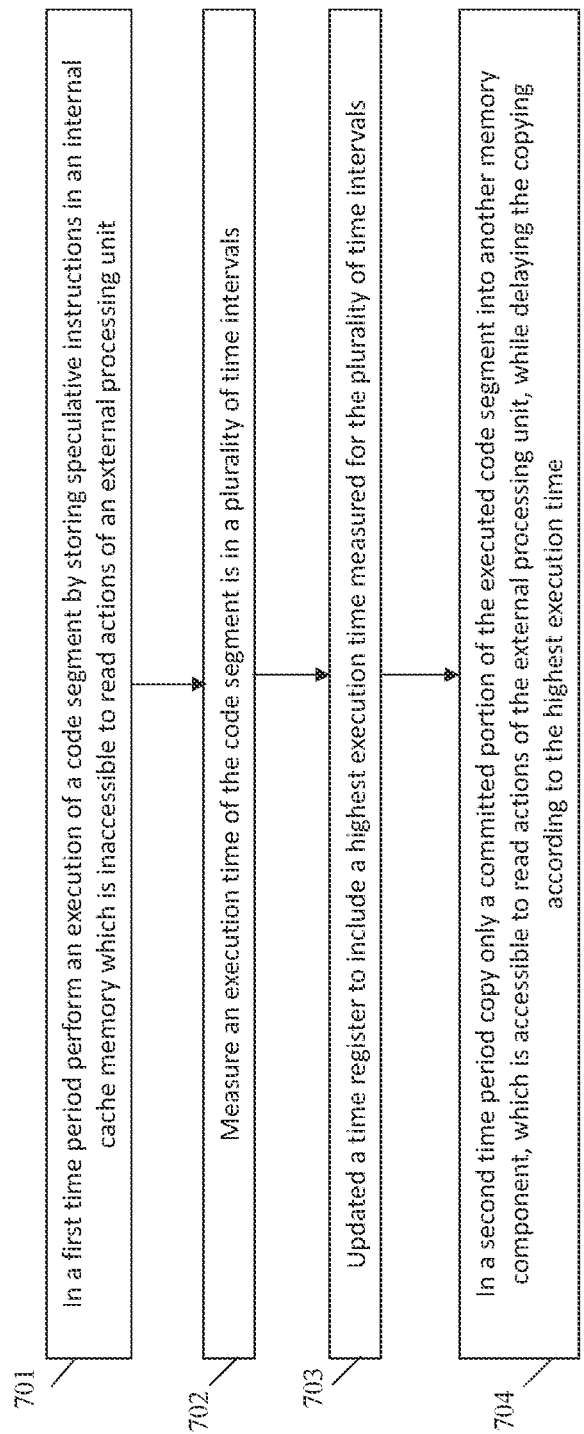
FIG. 7 schematically shows a flowchart of a method for protecting a speculative execution processor from side channel attacks, according to some embodiments of the present disclosure.

FIG. 7 schematically shows a method for protecting a speculative execution processor from side channel attacks, according to some embodiments of the present disclosure. At 701, in a first time period an execution of a code segment is performed by storing speculative instructions in an internal cache memory which is inaccessible to read actions of an external processing unit. At 702, an execution time of the code segment is measured in a plurality of time intervals (each time the code segment is executed). At 703, a time register is updated to include a highest execution time measured for the plurality of time intervals. At 704, in a second time period only a committed portion of the executed code segment is copied into another memory component such as a cache memory, one or more registers and the like, which is accessible to read actions of the external processing unit, while delaying the copying according to the highest execution time. The first and second time periods are different and independent, so that the commit time is not dependent of the executed data.

According to some embodiments of the present disclosure, a computer program product provided on a non-transitory computer readable storage medium storing instructions for performing a method for protecting speculative execution processor, from side channel attacks, is provided. The method performed by the computer program product, comprises: in a first time period performing an execution a code segment by storing speculative load and store instructions in an internal cache memory which is inaccessible to read actions of an external processing unit;

in a second time period copying only a committed portion of the executed code segment into another cache memory which is accessible to read actions of the external processing unit. The first and second time periods are different.

According to some embodiments of the present disclosure, the method performed by the computer program product, further comprises:

measuring an execution time of the code segment in a plurality of time intervals;

updating a time register to include a highest execution time measured for the plurality of time intervals; and delaying the copying only the committed portion of the executed code segment into the another cache memory according to the highest execution time.

Simulation results are presented herein to support the advantages of the present disclosure. The simulation model is based on a simple scalar, out-of-order architecture. FIG. 8 schematically shows a table of the basic simulation parameters, according to some embodiments of the present disclosure and FIG. 9 schematically shows a table, which provides the machine configurations used for these simulations, according to some embodiments of the present disclosure.

In all simulations, three different configurations were used: narrow (resembling ARM M processor), medium, and wide (resembling Intel® Coffee Lake processor).

The performance evaluation started by looking at the basic performance parameters (Inter processing communication (IPC)) measured for different hardware configurations when executing different programs out of the standard performance evaluation corporation (SPEC) benchmark.

Figure 10:
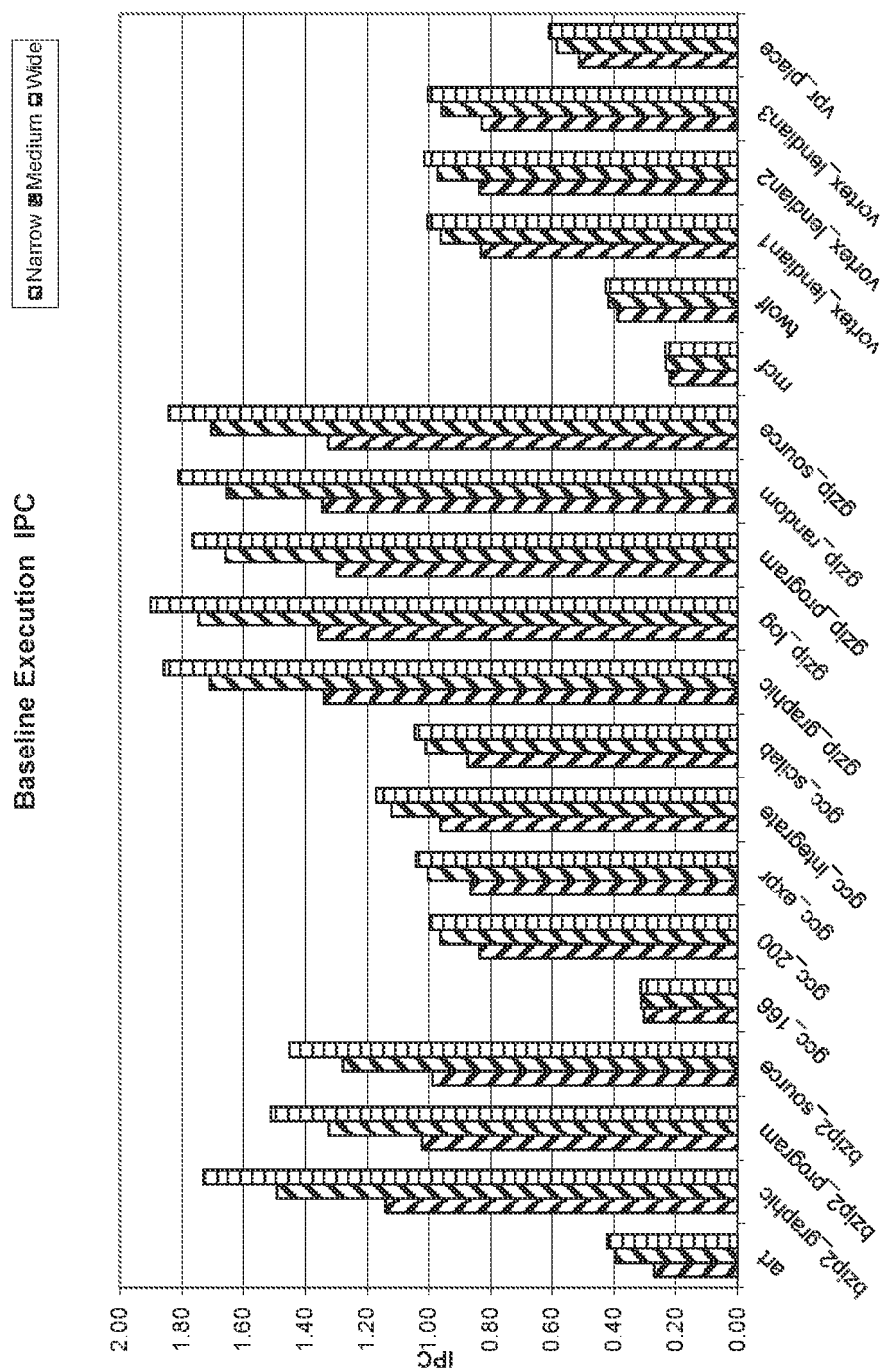
FIG. 10 schematically shows the baseline performance for the narrow, medium and large configuration simulation, according to some embodiments of the present disclosure.

FIG. 10 schematically shows the baseline performance for the narrow, medium and large configuration simulation, according to some embodiments of the present disclosure. FIG. 10 indicates that for most applications, moving from narrow configuration to medium configuration significantly affects performance, while moving from medium configuration to wide configuration has a significant contribution only to a subset of these applications.

According to some embodiments of the present disclosure, the architecture of the system postpone the commit time of data to be the same for all execution paths, or inserts randomization of the time it takes to execute instructions to an external observer.

To examine the effect of postponing the timing of the commit phase, the first experiment executed each instruction twice (double execution). The effect of such a mechanism on the overall performance of the secured speculative execution processor is shown in FIG. 11.

Figure 11:
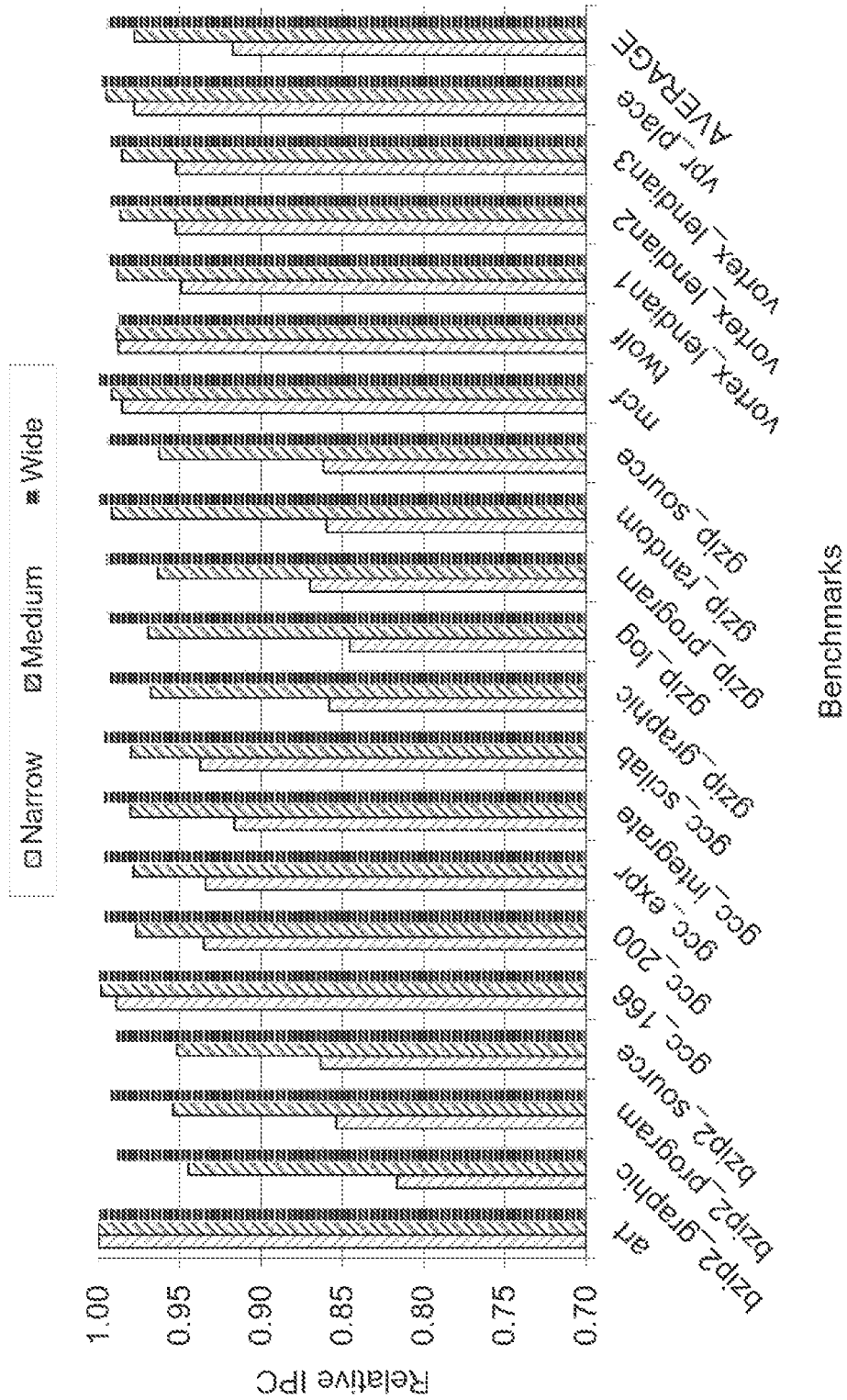
FIG. 11 schematically shows the results of simulations with a delayed commit time, according to some embodiments of the present disclosure.

FIG. 11 schematically shows the results of simulations with a delayed commit time, according to some embodiments of the present disclosure. FIG. 11 indicates that the impact of delaying the commit on narrow architectures is significant (worst case=0.817, average=0.917). However, when focusing on medium (worst case=0.945, average=0.978) or wide (worst case=0.995, average=0.988) architectures, the slowdown introduced by delaying the commit is negligible.

Another way to prevent timing side-channel attacks is to choose the delay time randomly. In the current simulation infrastructure, this effect was measured by randomly choosing the delay before starting the second execution round.

Figure 12:
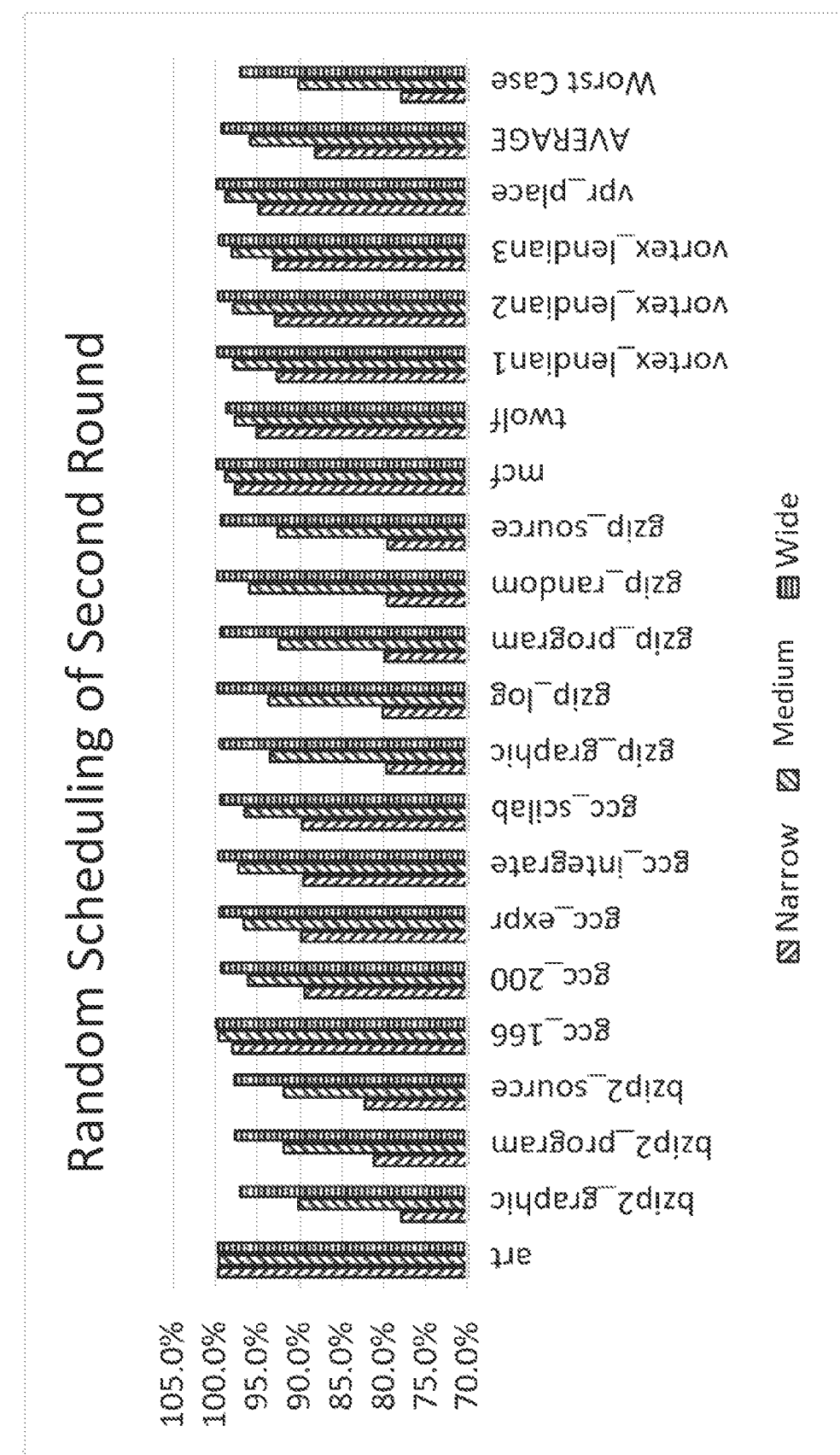
FIG. 12 schematically shows results of a simulation where the commit time was randomly chosen, according to some embodiments of the present disclosure.

FIG. 12 schematically shows results of a simulation where the commit time was randomly chosen. The results presented in FIG. 12 indicates that the random delay of a commit time can have a significant impact on a narrow architecture, but may have only a slight impact when wide architecture is selected (0.8% performance hit on average and 3% performance hit in the worst case.)

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant secured speculative processors will be developed and the scope of the term secured speculative processor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A system for protecting a speculative execution processor, from side channel attacks, comprising a processing circuitry, adapted to:
   in a first time period, performing a plurality of executions of a same code segment in a plurality of time intervals and measure an execution time of the code segment in each of the plurality of time intervals;
   updating a time register to include a highest execution time measured for the plurality of time intervals;
   storing speculative instructions in an internal cache memory which is inaccessible to read actions of an external processing unit;
   in a second time period, performing a delayed copy, wherein in said delayed copy, copying only a committed portion of the executed code segment into another memory component which is accessible to read actions of the external processing unit, wherein a delay time of said delayed copy is according to the highest execution time included in said time register;
   wherein the first and second time periods are different and independent.

2. The system of claim 1, wherein the processing circuitry is further adapted to:
   delay the copying only the committed portion of the executed code segment into the another memory component according to a value which is not correlated with the actual execution time measured.

3. The system of claim 1, wherein a user annotates a beginning and an end of the code segment with dedicated instructions respectively.

4. The system of claim 3, wherein the executed code segment annotated by the user is a single entry code segment.

5. The system of claim 3, wherein the executed code segment annotated by the user is a multi-entry code segment.

6. The system of claim 5, wherein the annotation of the multi-entry code segment is extended, according to a number of an entry.

7. The system of claim 5, wherein in the multi entry code segment each entry is allocated in a table-like structure and each entry number is determined by using one or more hash functions that take an address of an instruction annotating the beginning of the code segment as a parameter.

8. The system of claim 1, wherein the processing circuit is further adapted to add noise in conjunction with the execution of the code segment to increase a noise to signal ratio.

9. The system of claim 1, wherein the processing circuitry is adapted to perform a double execution of the code segment.

10. The system of claim 1, wherein the speculative instructions stored in the internal cache memory are load and store instructions.

11. The system of claim 1, wherein the internal cache memory is virtually tagged.

12. The system of claim 1, wherein the internal cache memory is exclusive so that data cannot be stored in the internal cache memory and into the another memory component at a same time.

13. The system of claim 1, wherein the internal cache memory is cleaned at an end of a process.

14. The system of claim 1, wherein the internal cache memory is dynamically partitioned among different threads.

15. The system of claim 1, wherein the internal cache memory is a scratchpad memory.

16. A method for protecting speculative execution processor, from side channel attacks, comprising:

in a first time period, performing an execution of a code segment by storing speculative instructions in an internal cache memory which is inaccessible to read actions of an external processing unit;

measuring an execution time of the code segment in a plurality of time intervals;

updating a time register to include a highest execution time measured for the plurality of time intervals;

in a second time period, performing a delayed copy, wherein in said delayed copy, copying only a committed portion of the executed code segment into another memory component which is accessible to read actions of the external processing unit, wherein a delay time of said delayed copy is according to the highest execution time included in said time register;

wherein the first and second time periods are different and independent.

17. A computer program product comprising a non-transitory computer readable storage medium storing instructions for performing a method for protecting speculative execution processor, from side channel attacks, comprising:

in a first time period, performing an execution of a code segment by storing speculative instructions in an internal cache memory which is inaccessible to read actions of an external processing unit;

measuring an execution time of the code segment in a plurality of time intervals;

updating a time register to include a highest execution time measured for the plurality of time intervals;

in a second time period, performing a delayed copy, wherein in said delayed copy, copying only a committed portion of the executed code segment into another memory component which is accessible to read actions of the external processing unit, wherein a delay time of said delayed copy is according to the highest execution time included in said time register;

wherein the first and second time periods are different and independent.

* * * * *